Oct. 7, 1952   S. E. SHILTS   2,612,720
TRAP CHAIN RING
Filed April 10, 1946
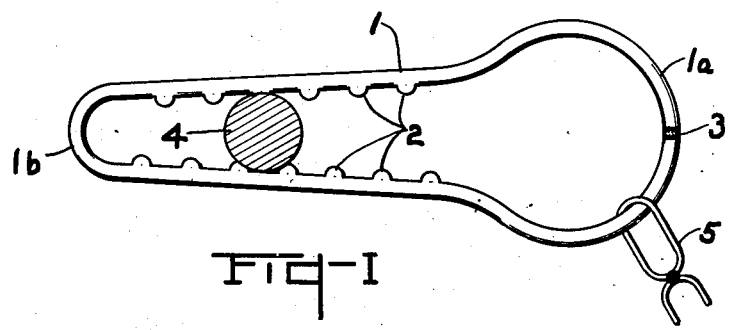
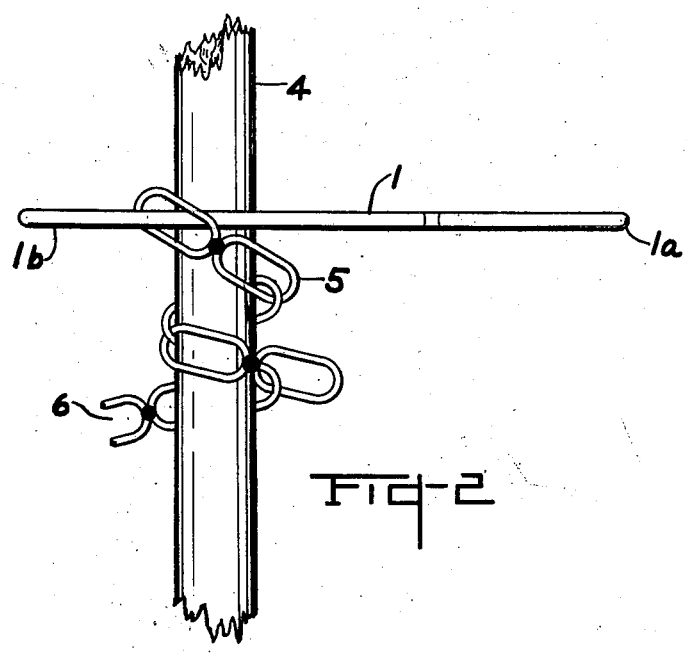
INVENTOR
Shirley E. Shilts
BY Roy A. Plant
ATTORNEY Patented Oct. 7, 1952

2,612,720

UNITED STATES PATENT OFFICE 2,612,720

TRAP CHAIN RING

Shirley E. Shilts, Olivet, Mich.

Application April 10, 1946, Serial No. 660,994

2 Claims. (Cl. 43—96)

The present invention relates broadly to animal trapping equipment, and specifically to the anchoring ring or link on the end of a trap chain.

This invention grew out of numerous reports and several years personal experience of finding that an animal had been trapped only to escape by wringing off the foot held in the trap or by pulling the foot free from the trap by clawing the earth with the other feet. These escaped animals are cripples and usually starve during the winter or fall easy prey to other animals and the pelt is lost. Nearly all boys of the rural area have at least a limited knowledge of trapping, and when the trapping season is over, and the totals are taken, the feet held in the traps which were left by animals that made their escape, usually outnumber and sometimes greatly exceed the number of pelts taken.

I realize that steel traps with round stake rings have been on the market for years and years. I therefore do not claim any power for this invention to catch animals, it simply has to do with holding the trapped animal by winding the trap chain around the trap stake until the chain is all used up, thereby holding the animal in the deeper water to drown.

The trap utilizing my improved link is set in the usual manner as the link plays no part in the actual operation of the trap making the catch. After the trap is in the desired location, the trap chain and link are extended to the deeper water. With the small end of my improved link in the palm of the hand, the chain will extend from the large or round end of the link. The trap stake is then placed through the large or round end of the link and passed into the water and down into the earth until firmly held. Then with a back and forth side motion the link is forced onto the trap stake until it is securely held on the stake by the nubs on the inner portion of the link with the chain extending from the large end of same. The taper of the link from its large end toward the small end is especially designed to receive various sizes of trap stakes, and firmly grip same when forced thereon. Mounting the assembly in this manner does not permit a trapped animal to go around the stake without winding up the chain, and when the chain is all wound around the stake the animal is in water too deep for him to stand in and the weight of the trap soon tires him so that he drowns.

Accordingly among the objects of the present invention is the provision of an improved link used in the place of the round ring found at the end of the chain of the common steel trap designed for taking fur bearing animals which live in marshes and along streams.

Another object is to facilitate drowning the trapped animal when the trap is fastened to a stake with my improved link, and such stake is in water as deep as or deeper than, the height of the animal to be taken.

Another object is to provide means in connection with traps staked in water, wherein a larger portion of the trapped animals are drowned, thereby reducing losses which means more profit for the trapper and less cripples left.

Another object is to drown and submerge the trapped animal as promptly as possible so as to reduce the chances of damage to its pelt, since wild animals attack even one of their own number when found in distress.

Another object is to provide an improved trap chain link which securely locks to the trap stake so that the trap and drowned animal will follow the trap stake up without falling off when the trap stake is removed from the water. Also when heavy rains or sudden thaws cause the streams to rise sharply and grass, sticks, and debris float down and sometimes dislodge the trap stakes, more of these traps can be recovered if the trap and trap stake stay together as a unit. When the stakes float down stream they will lodge in low-hanging branches and in driftwood jams, where the trapper is able to recognize and identify his stakes even if only partly visible.

A further object is to provide a trap chain link which is simple so that anyone can use it, and wherein it will be of real aid to trappers, old and young alike.

Still further objects and advantages of the invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 shows a top view of a preferred form of the trap chain link mounted on a trap stake.

Figure 2 shows a side view of an assembly similar to that illustrated in Figure 1 except that the chain is shown as fastened to the small end of the link and wound around the trap stake.

The sole purpose of my improved trap chain link is to fasten the trap chain securely to the trap stake so that the animal will wind the chain or trap tie around the stake and drown, but while this is being done, other things are also accomplished. First, the drowned animal is out in the water submerged, or nearly submerged, and safe from other animals that might cause pelt damage. Second, by quickly drowning, the trap is capable of holding a larger animal, such animals usually pull the trap stake and escape if left to fight the trap for hours. Third, with the trap chain securely fastened to the trap stake the ring cannot slip off the end of the trap stake while trapping in deep water. Fourth, by quickly drowning the animal, much unnecessary suffering is eliminated. The animal must die for the trapper to take its pelt, and the quicker it dies, the better it is for all concerned. Thus my improved link will make the common steel trap more humane. Fifth, if the trap is set for animals on dry land and where there would be little or no advantage in causing the animal to wind the chain around the trap stake, simply stake the trap by putting the trap stake through the large round end of the link without locking it against rotation around the stake.

In the working model, which is shown in the drawing, number nine gage wire was used. The invention is not limited to that material since flat stock metal such as iron or steel of substantially the same proportions might give more strength and handle better in the presses, a thing which the manufacturer would determine to meet his own requirements.

The improved link is somewhat pear shaped with the larger end round and similar to the round chain ring now in use on steel traps, but from there a taper is maintained until the smaller end is reached. Along this taper on each side, but only on the inside, are two rows of nubs which extend toward each other but none are exactly opposite. These nubs are pressed to extend from the wire but are definitely a part of the wire. The same pressure from each side makes them extend from the exact center of the wire. These nubs and the spring or resilience of the wire are what lock the improved link firmly on the trap stake.

Referring more particularly to Figure 1 of the drawing the link 1 is shown with oppositely directed alternating nubs 2 and a smooth weld 3. This link is firmly locked on trap stake 4 between a trio of nubs 2. There will always be three of these nubs bearing against the sides of the trap stake. These nubs, all being of the same size, can be conventionally formed from the wire by means of an industrial stamping press having suitable nub forming dies.

The link 1 is fastened to a fettering member, preferably in the form of a trap chain 5, by passing the link 1 through the trap chain link most distant from the trap. The weld 3 of this link may be located at the center of the large or round end 1a. It is essential that the link be smoothly welded so that the trap chain 5 will be free to slide on the link up to the stake, and extend from any part of same in any direction.

In non-freezing weather link 1 may be locked on the trap stake 4 at the surface of the water, or where the water line would come, and then the trap chain will be wound around the stake by the trapped animal below the link 1 as shown in Figure 2. During freezing weather, to avoid ice and for the more trap shy animals, it is best to conceal the trap chain by placing the link 1 as deep down in the water as possible. Thus when the trapped animal swims around the trap stake 4, while trying to escape, the trap chain 5 will wind around the stake above the link 1.

For purposes of explaining the invention, Figure 2 shows the link 1 locked to the trap stake 4, with the trap chain extending from the small end 1b of the link. Pressure on the trap chain 5 extended from the small end 1b of link 1, would tend to loosen the grip of the link 1 on the stake so that the link would become rotatable and thus stop the winding of chain 5 on stake 4 with the advantages incident to same. On the other hand, when the trap chain extends, as it always should, from the round end 1a as shown in Figure 1, the pull will tend to tighten the grip of link 1 on stake 4 and thus facilitate its holding in place and the winding of the chain around the stake to ultimately cause the trapped animal to drown. The trapped animal can exert very little pressure on the link 1 while swimming around the trap stake 4 with a trap on its foot. The remainder of the trap chain 5, Figure 2, continues from partial link 6 to the trap. Neither the drowned animal nor the trap are shown in the drawing since they do not form part of the present invention.

Steel traps are made in various sizes and the link 1 of the present invention would be made in corresponding sizes. In connection with the smaller traps such as sizes number one, and number one and one half, which are used for taking muskrats, mink, and raccoon, the link 1 is preferably four and one half inches long, with the large end 1a having a diameter of one and one half inches while the smaller end 1b has an internal diameter of one half inch. The sides of the link gradually taper out from the small end until they are three-quarters of an inch wide at the throat leading into large end 1a. Nubs 2, which preferably have a 3/64 inch radius, and which are mounted on the opposite inner edges of this tapered portion, may be spaced three-eighths of an inch apart, with the nubs on one edge staggered relative to those on the other edge as shown in Figure 1 of the drawing.

Other modes of applying the principle of my invention may be employed instead of those explained, change being made as regards the article herein disclosed, provided the means stated by any of the following claims or the equivalent of such stated means be employed.

I therefore particularly point out and distinctly claim as my invention:

1. The combination of a trap chain and a chain holder for attachment to a stake, said chain holder being formed of heavy gage wire material having a substantially circular formation at one end, a portion of said circular formation merging into straight converging legs connected together at their outer ends, the substantially circular part having no obstructions throughout its length, the portion of the chain adjacent to the holder having a link provided with an opening of greater extent than the greatest thickness of the substantially circular portion to permit free travel of the link on that portion for substantially 270° in an arc, said converging legs having protuberances on sides thereof facing each other, said protuberances being spaced a substantial distance from each other so as to permit a side of a stake to be seated between two adjacent protuberances on one leg and engage a side wall of the leg while a protuberance on the opposite leg mounts the stake in fixed relation on its seat, said latter protuberance being located substantially directly opposite the center between two protuberances on the other leg, the protuberances on each of said legs which extend from said substantially circular portion, when in engagement with said stake, constituting with said stake, stops to limit movement of the link of the chain to the confines of the portion of said chain holder and that portion of said converging legs up to the adjacent side of said protuberance engaged stake.

2. The combination of a trap tie and a tie holder for attachment to a stake, said tie holder being formed of metal having a substantially circular formation at one end, a portion of said circular formation merging into straight converging legs connected at their outer ends, the substantially circular part being free of obstructions throughout its length, the portion of the tie adjacent the holder having a loop with an opening therein of greater extent than the greatest thickness of the substantially circular portion to permit free travel of the loop on that portion for substantially 270° in an arc, said converging legs having protuberances on opposed sides thereof, the protuberances being spaced a substantial distance from each other so as to permit a side of a stake to be seated between two adjacent protuberances on one leg and engage a side wall thereof while a protuberance on the opposite leg mounts the stake in fixed relation on its seat, said latter protuberance being located substantially directly opposite the center between two protuberances on the other leg, the protuberances on each leg including those adjacent the ends of the tie holder constituting stops to limit movement of the tie loop to the confines of said tie holder from the ends thereof to the adjacent side of said protuberance engaged stake.

SHIRLEY E. SHILTS.

REFERENCES CITED

The following references are of record in the file of this patent:

UNITED STATES PATENTS

| Number | Name | Date |
| --- | --- | --- |
| 135,899 | Foote | Feb. 18, 1873 |
| 152,762 | Mutter | July 7, 1874 |
| 1,250,308 | Hanson | Dec. 18, 1917 |
| 1,264,515 | Heckenkamp | Apr. 30, 1918 |
| 1,330,320 | Heyl | Feb. 10, 1920 |
| 1,634,177 | Dart | June 28, 1927 |
| 1,853,735 | Lawler | Apr. 12, 1932 |